O. HUSSEY.
Harvester Cutter.
No. 450. Reissued April 14, 1857.
Fig. 1
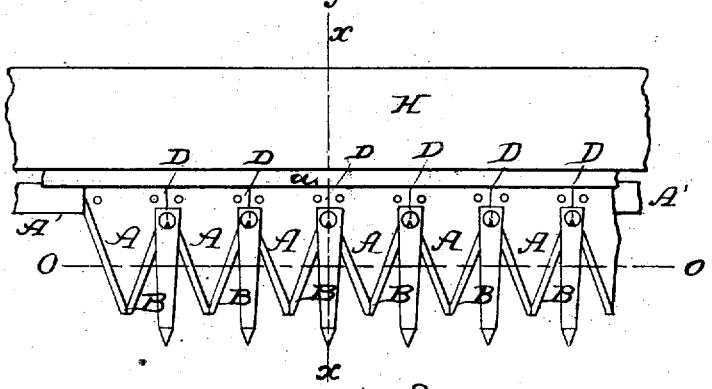
Fig. 6
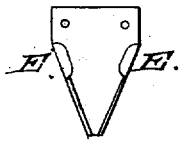
Fig. 7
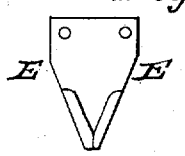
Fig. 2
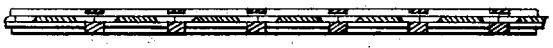
Fig. 8
Fig. 3
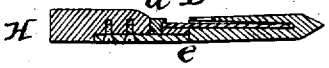
Fig. 5.
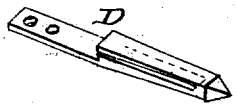
Fig. 4.
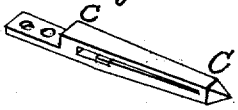
N. PETERS, Photo-Lithographer, Washington, D. C.

UNITED STATES PATENT OFFICE.

OBED HUSSEY, OF BALTIMORE, MARYLAND.

IMPROVEMENT IN REAPING-MACHINES.

Specification forming part of Letters Patent No. 5,227, dated August 7, 1847; Reissue No. 450, dated April 14, 1857.

DIVISION B.

*To all whom it may concern:*

Be it known that I, OBED HUSSEY, of the city of Baltimore, in the county of Baltimore and State of Maryland, have invented a new and useful Improvement in Reaping-Machines; and I do hereby declare that the following is a full, clear, and exact description of the construction and operation of the same, reference being had to the annexed drawings, making a part of this specification, in which—

Figure 1 is a bird's-eye view of the cutting apparatus, in which A A A A A A represent angular blades, and A′ A′ the stock, of a vibrating sickle, the blades being riveted or otherwise secured to the stock, and so constructed and arranged that their cutting-edges form a zigzag or scalloped line. B B B B B B represent the permanent guard-irons. H represents a part of the wood-work. The guards are formed of a lower piece and an upper piece, admitting the blade to pass between in cutting, so that the straw, grass, hemp, corn, &c., which comes in between the guards to be cut is firmly supported both above and below the vibrating blades.

In my original invention—viz., the reaping-machine patented by me in 1833—the upper part of the guards was fastened to the lower part both before and behind the blades, as represented at C C, Fig. 4, and the grass, straw, &c., which was not perfectly cut was forced in by the shearing motion of the blades and worked back between the blades and the guards, materially obstructing the free movement of the blades, in wet weather frequently causing what the farmers call "choking." The improvement for remedying this defect is represented at D, one piece of the guard being fastened to the other piece only at the point, leaving their back ends unconnected; consequently the space between the upper and lower pieces of the guard, through which the blades vibrate, is open behind, so that the grass, &c., which is forced in by the action of the blades, now passes freely out through the opening.

In my original sickle, patented in 1833, the blades are ground with a bevel on both sides of the edge. The purpose of this is that by means of the shoulder of the bevel the sharp edge is prevented from coming in contact with the finger, and when sprung or bent cutting into the finger. This bevel is not so necessary near the forks of the blades as near their points, where they spring more easily, and as the double bevel diminishes their shearing action, I prefer to make about one inch of edge at the fork flush on one side, leaving the bevel all on the other side. The design of this is that the grass, &c., which is forced in between the blades and the guards shall be cut up and worked out by the flush edge acting close to the finger at the forks of the blades.

Fig. 2 represents a vertical section at the line *o o*, and Fig. 3 another at the line *x x*, of Fig. 1. Fig. 4 represents one of the guards of my original machine. Fig. 5 represents one of the guards containing the improvement thereof before described. At the rear of the slots a flanged guide-bar, *a*, Figs. 1 and 3, is secured to the guards for the back of the stock of the sickle to slide against, leaving the shoulders *e* of the finger to act as guides for the front of the stock. Fig. 6 represents a plan of the upper side, Fig. 7 a plan of the under side, and Fig. 8 a side elevation, of one of the improved blades of my sickle, with the flush edge E E on each side of and at the fork of the blade.

The rearward or retreating angles of the zigzag edge of the sickle I call the "forks" of the blades and the forward or salient angles I call the "points" of the blades.

I claim as my invention and desire to secure by Letters Patent—

The improved beveling of the edges of the blades of scalloped sickles, as herein described.

In testimony whereof I have hereunto subscribed my name.

OBED HUSSEY.

In presence of—
WM. D. BALDWIN,
HENRY BALDWIN, Jr.